US008498273B2

(12) United States Patent
Wang et al.

(10) Patent No.: US 8,498,273 B2
(45) Date of Patent: Jul. 30, 2013

(54) MANAGEMENT OF UPLINK RESOURCES IN MULTI-CARRIER CDMA SYSTEM

(75) Inventors: Yi-Pin Eric Wang, Fremont, CA (US); Anders Wallén, Ystad (SE); Stephen Grant, Pleasanton, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 512 days.

(21) Appl. No.: 12/537,148

(22) Filed: Aug. 6, 2009

(65) Prior Publication Data

US 2011/0032885 A1 Feb. 10, 2011

(51) Int. Cl.
*H04B 1/707* (2011.01)
(52) U.S. Cl.
USPC ............ 370/335; 370/337; 370/441; 370/442
(58) Field of Classification Search
None
See application file for complete search history.

(56) References Cited

U.S. PATENT DOCUMENTS

| | | | | |
|---|---|---|---|---|
| 6,956,835 B2* | 10/2005 | Tong et al. | ..................... | 370/330 |
| 7,787,416 B2* | 8/2010 | Gidwani | ........................ | 370/329 |
| 7,912,135 B2* | 3/2011 | Kwak et al. | .................... | 375/260 |
| 2002/0097697 A1* | 7/2002 | Bae et al. | ....................... | 370/335 |
| 2009/0092055 A1 | 4/2009 | Balasubramanian et al. | | |

OTHER PUBLICATIONS

Ericsson: "MAC Happy Bits for UL", 3GPP Draft; R2-074059_MAC happy Bits, 3$^{rd}$ Generation Partnership Project (3GPP), Mobile Competence Centre, 650, Route Des Lucioles, F-06921 Sophia-Antipolis Cedex, France vol. RAN WG2, no. Shanghai, China; Oct. 1, 2007.

* cited by examiner

*Primary Examiner* — Alex Skripnikov

(57) ABSTRACT

The method an apparatus described herein manages uplink resources to increase spectral efficiency and system capacity. According to one embodiment of the present invention, a base station may be assigned two or more downlink carriers for downlink transmission and two or more corresponding uplink carriers. In a multi-carrier mode, the base station may transmit signals on two or more downlink carriers to the same mobile terminal, and receive signals from the mobile terminal on one of the paired uplink terminals. The uplink carriers can be operated at different interference levels and the uplink traffic can be divided between the available uplink carriers based on the type of traffic and/or data transmission parameters. The mobile terminals may also be allowed to switch between the uplink carriers to improve overall efficiency.

10 Claims, 5 Drawing Sheets

MANAGEMENT OF UPLINK RESOURCES IN MULTI-CARRIER CDMA SYSTEM

BACKGROUND

The present invention relates generally to multi-carrier communication systems and, more particularly, to management of uplink resources in a multi-carrier communication system.

Enhanced uplink, also known as High Speed Uplink Packet Access (HSUPA) was introduced in Release 6 of the Wideband Co-Division Multiple Access (WCDMA) standard to provide higher data rates on the uplink. HSUPA supports data rates of up to 11.52 megabits per second in the uplink using higher order modulation, fast power control, fast scheduling, and fast hybrid ARQ (HARQ) with soft combining. Two new physical uplink channels were added to the WCDMA standards to support HSUPA: the enhanced dedicated physical data channel (E-DPDCH) and the enhanced dedicated physical control channel (E-DPCCH). The E-DPDCH is the uplink channel used to carry user data bits from the mobile terminal to the base station, referred to in the standard as an enhanced NodeB (eNodeB). The E-DPCCH carries control information necessary to enable the base station to demodulate and decode the E-DPDCH.

Conventional WCDMA systems operate with a single uplink carrier. Release 8 of the WCDMA standard will allow transmission from the base station to the mobile terminals on two adjacent carriers. On the uplink, the mobile terminals will still use a single carrier for uplink transmissions. However, the mobile terminals may be allowed to switch between two different uplink carriers that are paired with the two downlink carriers.

Realizing the high data rates that are supported by HSUPA has been challenging. When a user terminal transmits at a high data rate on the uplink carrier, a high signal-to-interference plus noise ratio (SINR) at the receiver is needed in order to demodulate and decode the transmission. This means that the user terminals' receive power at the base station must be high, which will create interference for other users (e.g., voice users or low rate data users), as well as important control channels. These other users will then need to increase their transmit power to avoid degradation, thus further increasing the interference levels at the receiver. When the interference levels become too high, the system becomes unstable.

Therefore, improvements in managing uplink resources are needed in order to manage the interference generated by high data rate users.

SUMMARY

The present invention provides a method an apparatus for managing uplink resources to increase spectral efficiency and system capacity. According to one embodiment of the present invention, a base station may be assigned two or more downlink carriers for downlink transmission and two or more corresponding uplink carriers. In a multi-carrier mode, the base station may transmit signals on two or more downlink carriers to the same mobile terminal, and receive signals from the mobile terminal on one of the paired uplink terminals. However, the mobile terminal transmits signals on the uplink using only one of the paired uplink carriers.

The uplink carriers can be operated at different interference levels and the uplink traffic can be divided between the available uplink carriers based on the type of traffic and/or data transmission parameters. As one example, one uplink carrier may be used to carry voice, low-rate data, and control channels, while a second carrier may be used to carry high-rate data. By segregating different types of traffic on different carriers, the low-rate data, control channels, and other traffic carried on the anchor carriers are protected from excessive levels of interference attributable to the high-rate data transmissions.

The mobile terminals may also be allowed to switch between the uplink carriers to improve overall efficiency. For example, a mobile terminal may be allowed to switch from a first uplink carrier operated at a low interference level to a second uplink carrier operated at a high interference level depending on a data transmission rate and/or buffer level. The mobile terminal may also switch uplink carriers based on a happiness indication reflecting the buffer level of the mobile terminal.

DETAILED DESCRIPTION

Figure 1:
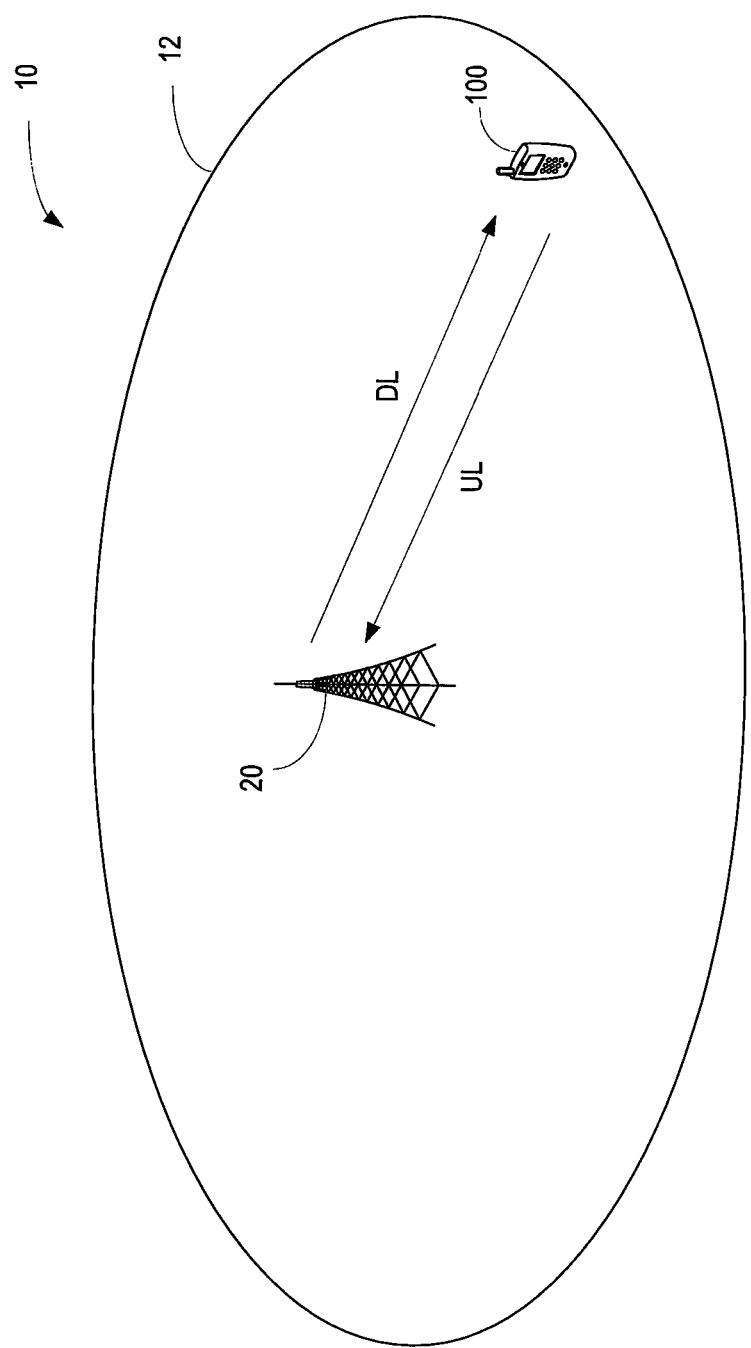
FIG. 1 illustrates an exemplary multicarrier communication system.

Referring now to the drawings, FIG. 1 illustrates a user terminal 100 in a mobile communication network 10. The user terminal 100 may comprise, for example, a cellular telephone, personal digital assistant, smart phone, laptop computer, handheld computer, or other device with wireless communication capabilities. User terminal 100 communicates with a base station 20 in a serving cell or sector 12 of the mobile communication network 10. The user terminal 100 receives signals from the base station 20 on one or more downlink (DL) channels and transmits signals to the base station 20 on one or more uplink (UL) channels.

For illustrative purposes, an exemplary embodiment of the present invention will be described in the context of a Wideband Code Division Multiple Access (WCDMA) system. Those skilled in the art will appreciate, however, that the present invention is more generally applicable to other wireless communication systems, including Long Term Evolution (LTE) and WiMAX (IEEE 802.16) systems.

Enhanced Uplink in WCDMA, also referred to as High Speed Uplink Packet Access, provides high speed uplink access the mobile terminals 100 served by the base station 20. The mobile terminals 100 transit data to the base station 20 on a transport channel referred to as the Enhanced Dedicated Channel (E-DCH). As the name implies, the E-DCH is a dedicated channel. At any given time, a mobile terminal 100 may transmit on one or more E-DPDCHs, which is the physical data channel associated with the E-DCHs. A scheduler at the base station 20 coordinates transmissions by the mobile terminals 100 on the uplink. The mobile terminals 100 report buffer levels, power headroom, QoS requirements, and other scheduling information to the base station 20 in a scheduling request. Based on the instantaneous interferences levels at the receiver and the scheduling information received from the mobile terminals 100, the base station 20 determines which mobile terminals 100 are allowed to transmit and at what rates. The base station 20 transmits scheduling grants to the scheduled mobile terminals 100 to indicate when and at what rate the mobile terminals 100 are allowed to transmit. The scheduling grant typically specifies a ratio of E-DPDCCH-to-pilot power ratio allowed for the scheduled mobile terminal 100, and the mobile terminal 100 is allowed to select any transport block size (data rate) so long as the specified power ratio is not exceeded. In general, a higher power ratio corresponds with a higher data rate.

Conventional WCDMA systems operate with a single uplink carrier. Release 8 of the WCDMA standard allows transmission from the base station 20 to the mobile terminals 100 on two adjacent carriers. On the uplink, the mobile terminals 100 will still use a single carrier for uplink transmissions. However, the mobile terminals 100 may be allowed to switch between two different uplink carriers that are paired with the two downlink carriers.

Figure 2:
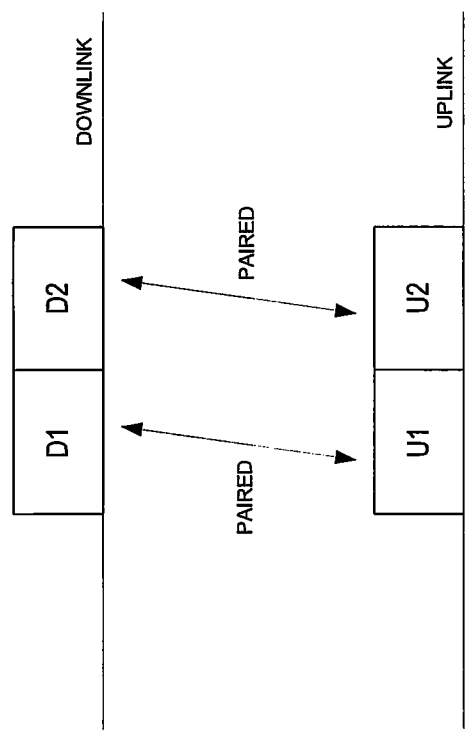
FIG. 2 illustrates an exemplary spectrum allocation for a base station in a multicarrier communication system.

FIG. 2 illustrates an exemplary spectrum allocation for multi-carrier HSPA. Carriers D1 and D2 are allocated for the downlink, and corresponding paired uplink carriers U1 and U2 are allocated for the uplink. In a multi-carrier mode, base station 20 uses carriers D1 and D2 for downlink transmissions to mobile terminal 100. In contrast, the mobile terminal 100 may use either one, but not both, of the uplink carriers U1 and U2 for uplink transmission. Mobile terminal 100 may also switch between uplink carriers U1 and U2 in different time periods depending on the data transmission rate of the mobile terminal 100 and/or other transmission parameters. There is a current 3GPP work item with the goal of introducing transmission on two adjacent carriers from the mobile terminals to the base station in future releases of the WCDMA standard. Still, it may be more beneficial to have the mobile terminals transmit on one carrier at a time only.

According to one embodiment of the present invention, the uplink carriers U1 and U2 are operated at different interference levels and the uplink traffic is divided between the two available uplink carriers U1 and U2 to improve spectral efficiency on the uplink. More specifically, one uplink carrier may be designated as an anchor carrier and operated at a relatively low interference level (e.g., 5-8 dB noise rise). The other uplink carrier, referred to herein as a supplemental carrier or non-anchor carrier, may be operated at a relatively high interference level (e.g., >15 dB noise rise) compared to the anchor carrier. The uplink carriers U1 and U2 may be used for different types of traffic. For example, the anchor carrier may be used to carry voice, low-rate data, delay-sensitive data, and control channels. The supplemental carrier may be used to carry high-rate data and other types of transmissions that generate high levels of interference. In one exemplary embodiment, the anchor carrier may include control channels for all traffic channels on both the anchor and non-anchor carriers. If a mobile terminal 100 is transmitting on the supplemental carrier, it cannot transmit an associated control channel on the anchor carrier, because the mobile terminal 100 can only transmit on one carrier at any given time. However, other mobile terminals can transmit control channels on the anchor carrier. By segregating different types of traffic on different carriers, the low-rate data, control channels, and other traffic carried on the anchor carriers is protected from excessive levels of interference attributable to the high-rate data transmissions.

At the base station 20, serving a cell 12 may schedule the mobile terminals 100 within the cell 12 to transmit on either the anchor carrier or supplemental carrier, depending on its transmission requirements. For example, it may be more efficient to schedule the mobile terminals having high data rate transmissions to transmit on the supplemental carrier using time-division multiplexing (TDM) because TDM provides better orthogonality between users. For low data rate transmissions, however, the base station 20 may schedule the mobile terminals to transmit on the anchor carrier using code-division multiplexing (CDM) because CDM has better trunking efficiency. Table 1 summarizes the differences between an anchor carrier and a supplemental carrier for one embodiment of the present invention.

TABLE 1

|  | Anchor Carriers | Supplemental Carriers |
| --- | --- | --- |
| Interference Level | Low (5-8 dB noise rise) | High (>15 dB noise rise) |
| Traffic | Voice, control, low-rate and/or delay insensitive data | High-rate data |
| Scheduling | CDM | TDM |

The carrier assignment can be signaled to the mobile terminals 100 in a scheduling grant transmitted on a downlink control channel. For example, the carrier assignment for a mobile terminal 100 can be transmitted to the mobile terminal 100 as part of an absolute grant transmitted on the Enhanced Absolute Grant Channel (E-AGCH). As is known in the art, the scheduler can update the serving grant of a mobile terminal 100 by sending an absolute grant. The absolute grant may be modified to include a field specifying the carrier to which the grant applies. In response to the absolute grant, the mobile terminal 100 may switch to the carrier specified in the absolute grant if a switch is necessary.

The decision to assign a mobile terminal 100 to the anchor carrier or supplemental carrier is made by a scheduler at the base station 20 based on scheduling information received from the mobile terminal 100. As previously noted, the scheduling information may include information such as the buffer level, available transmission power, QoS requirements, etc. Such information may be transmitted in-band on the Enhanced Dedicated Channel (E-DCH). Additionally, mobile terminal 100 may transmit a happiness indication, also referred to as a "happy bit," on the Enhanced, Dedicated Physical Control Channel (E-DPCCH). Generally speaking, the happiness indication comprises a single bit that indicates whether the mobile terminal 100 is capable of transmitting on the E-DCH at a data rate greater than what is currently allowed by the serving grant. When the mobile terminal 100 has available power to transmit at a higher data rate than allowed by the serving grant, and the number of bits in the buffer would require more than a predetermined number of TTIs to transmit, the mobile terminal 100 sets the happy bit to a first predetermined value to indicate that it is "not happy." "Not happy" means that the mobile terminal 100 would like to transmit at a higher data rate. Otherwise, the mobile terminal 100 sets the happy bit to a second predetermined value to indicate that it is "happy." It may be noted that the happy bit is only transmitted in conjunction with an on-going data transmission because the E-DPCCH is only transmitted together with the E-DPDCH.

In some embodiments of the invention, the happiness indication may be used to facilitate carrier switching. For example, assume that mobile terminal 100 is currently transmitting data on an anchor carrier. When the happiness indication is set to "happy," the scheduler at the base station 20 may continue to schedule the mobile terminal 100 on the anchor carrier. On the other hand, when the happiness indication is set to "not happy," the scheduler at the base station 20 can switch the mobile terminal 100 to the supplemental carrier to enable higher data transmission rates without generating interference for other users on the anchor carrier.

In some embodiments, more than two levels of happiness may be defined and the happiness indication may include more than one bit. The different levels of happiness may be related to the number of TTIs that the mobile terminal 100 would require to empty its transmit buffer under the current serving grant. For example, a tri-level happiness indication could be defined using two thresholds, denoted herein as T1 and T2, where T2 is less than T1. If the number of TTIs needed to empty the transmit buffer is greater than T1, the mobile terminal 100 may set the happiness indication to "not happy." If the number of TTIs required to empty the transmit buffer is greater than T2 but less than T1, the mobile terminal 100 may set the happiness indication to "slightly happy." Finally, if the number of TTIs required to empty the transmit buffer is less than T2, the mobile terminal 100 can set the happiness indication to "happy."

In some embodiments, several levels of "happiness" could be defined by imposing multiple thresholds denoted as $T_x$ representing the number of TTI's that the mobile terminal 100 needs to empty its transmit buffer at the current grant rate. For example, if the mobile terminal 100 can empty its buffer in N TTI's and $N > T_1 \ldots$, the happy bit can be set to "Not Happy". If $T_2 \leq N \leq T_1$, then the happy bit can be set to "Slightly Happy". If $N < T_2$, the happy bit can be set to "Happy". "Not Happy" could mean switching to or continuing on a supplemental carrier; "Slightly Happy" could mean switching to an anchor carrier if on supplemental carrier; and "Happy" could mean continuing on an anchor carrier, or discontinuing transmission temporarily.

When the system uses more than two types of carriers, the happiness indication can be used to bias the scheduler to select a particular carrier. In one exemplary embodiment, the system may be configured with a low data rate carrier, a medium data rate carrier, and a high data rate carrier. In this example, the happiness indication can be used to bias the scheduler towards a higher data rate carrier as the happiness level decreases. The degree of the bias may depend on the level of happiness. Regardless, some embodiments of the invention is use "Happy Bit(s)" in the scheduler to determine which carrier or carrier type and perhaps how many carriers the UE need to be scheduled.

Figure 3:
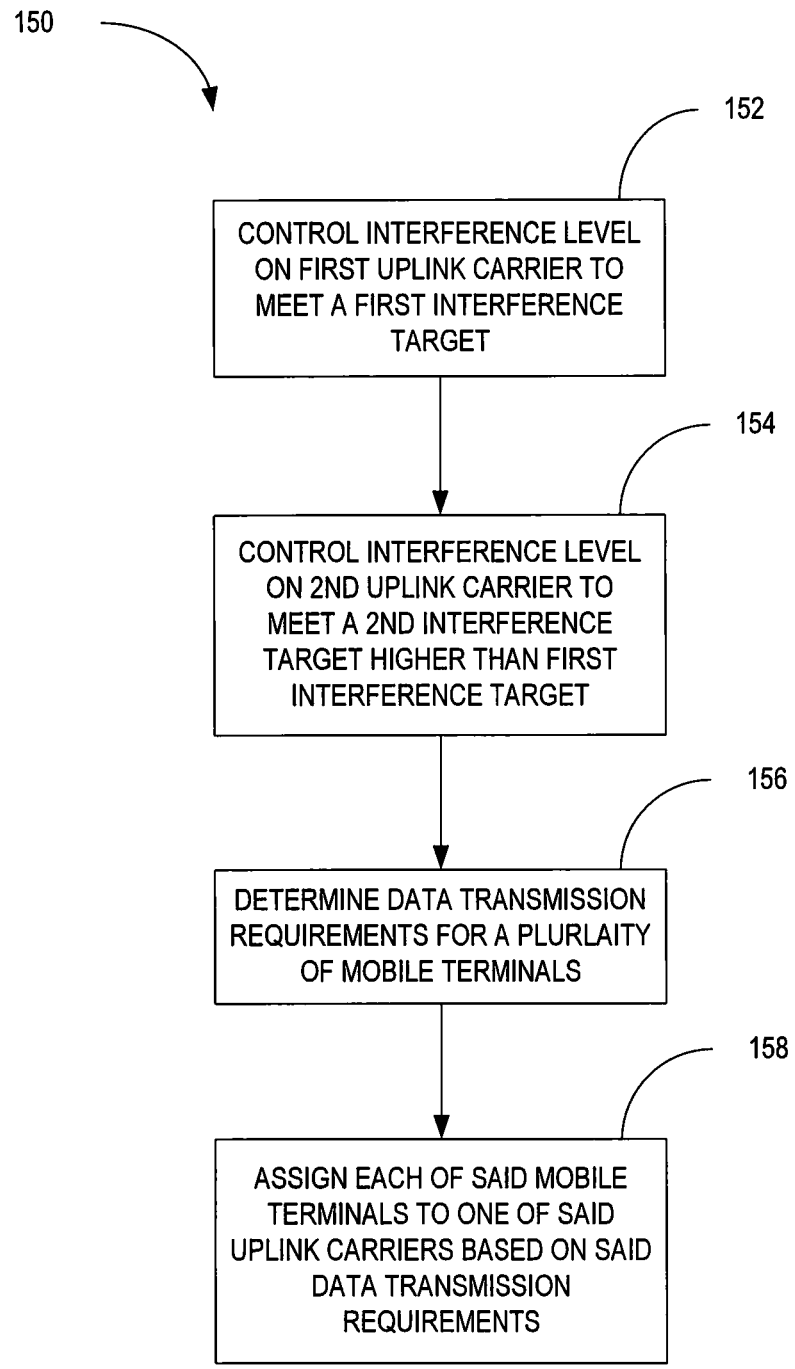
FIG. 3 illustrates an exemplary method implemented by a base station in a multicarrier communication system for selecting a carrier for uplink transmissions.

FIG. 3 illustrates an exemplary method 150 implemented by a base station 20 for controlling transmissions from a plurality of mobile terminals 100 on the uplink. Base station 20 controls the interference level on a first uplink carrier to meet a first interference target (block 152). The first interference target may, for example, comprise a low level of interference. The base station 20 also controls the interference level on a second uplink carrier to meet a second interference target higher than the first interference target (block 154). A scheduler at the base station 20 determines the data transmission requirements for a plurality of mobile terminals (block 156). Based on the data transmission requirements, the scheduler assigns each of the mobile terminals 100 to one of the uplink carriers (block 158). For example, the scheduler at base station 20 may assign low data rate mobile terminals 100 to the first uplink carrier, and high data rate mobile terminals to the second uplink carrier. Also, QoS requirements may be taken into account in carrier selection. For example, mobile terminals 100 with low delay tolerance may be assigned to the first carrier.

Figure 4:
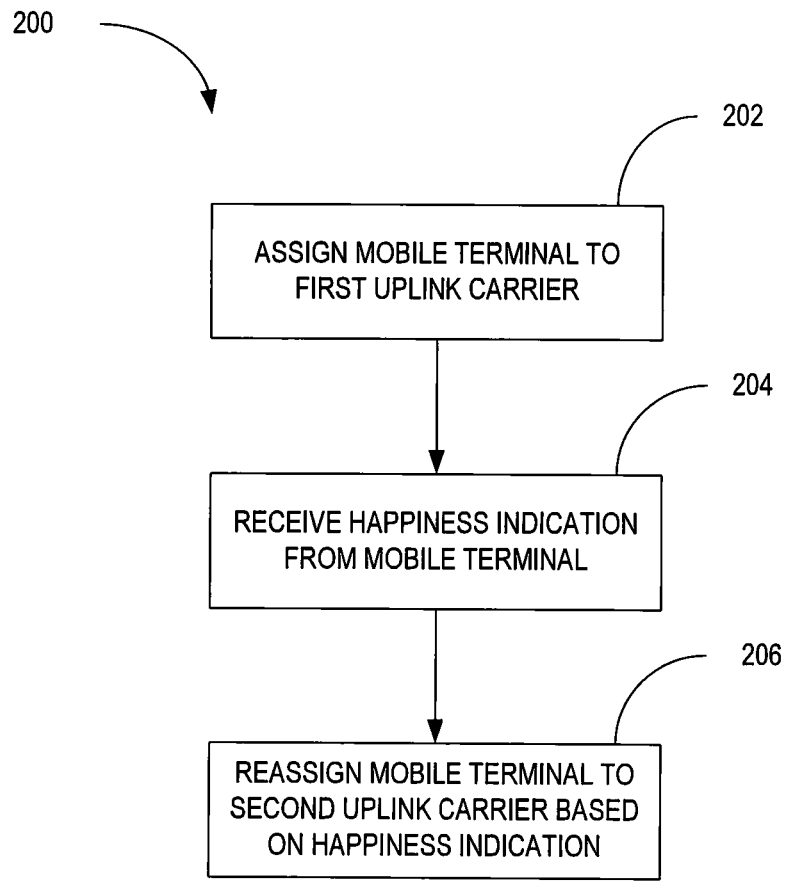
FIG. 4 illustrates an exemplary method implemented by a base station in a multicarrier communication system for controlling uplink transmissions from a plurality of mobile terminals.

FIG. 4 illustrates a method 200 implemented by a scheduler in base station 20 of selecting a carrier for uplink transmissions from a mobile terminal 100. The method 200 begins when the scheduler assigns a mobile terminal 100 to a first uplink carrier and begins receiving transmissions from the mobile terminal 100 (block 202). When the mobile terminal 100 is transmitting data, the mobile terminal 100 may also transmit a happiness indication on the E-DPCCH. The scheduler at the base station 20 receives the happiness indications from the mobile terminal 100 (block 204). The scheduler reassigns the mobile terminal 100 to the second uplink carrier depending, at least in part, on the happiness indication (block 206). For example, when mobile terminal 100 is transmitting on an anchor carrier for low data rate users, the scheduler may reassign the mobile terminal 100 to a second carrier if the happiness indication transmitted by the mobile terminal 100 indicates that the mobile terminal 100 is "not happy." In other embodiments, the happiness indication may be used to bias scheduling decisions toward the higher data rate carrier as the happiness level decreases.

Figure 5:
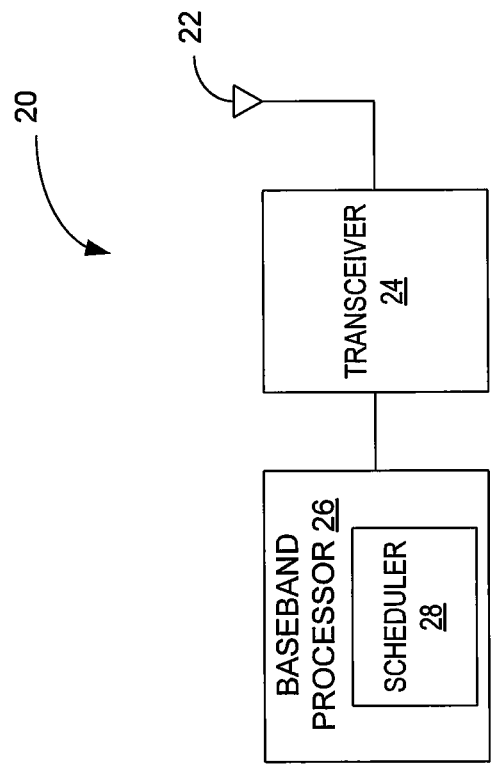
FIG. 5 illustrates an exemplary base station for a multicarrier communication system.

FIG. 5 illustrates an exemplary base station 20 according to one embodiment of the invention. Base station 20 comprises a transceiver 24 coupled to one or more antennas 22 and a baseband processor 26. Transceiver 24 comprises a transmitter for transmitting signals to mobile terminals 100, and a receiver for receiving signals from the mobile terminals 100. Baseband processor 26 comprises one or more processors, microcontrollers, hardware, or a combination thereof. The baseband processor 26 processes signals transmitted and received by the transceiver 24. For example, the baseband processor 26 may perform coding/decoding, modulation/demodulation, interleaving/deinterleaving, and other channel coding operations. Baseband processor 26 includes a scheduler 28 for scheduling the uplink transmissions from the mobile terminals 100. The scheduler 28 includes logic for performing the method shown in FIGS. 3 and 4.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling transmissions from a plurality of mobile terminals on an uplink carrier, said method comprising:
   controlling an interference level on a first uplink carrier to meet a first interference target;
   controlling an interference level on a non-first uplink carrier to meet a second interference target higher than the first interference target;
   determining individual data transmission requirements for the plurality of mobile terminals;
   assigning each of said mobile terminals to transmit user data on either the first uplink carrier or the non-first uplink carrier based on said data transmission requirements;
   scheduling users on said first uplink carrier using code-division multiplexing; and
   scheduling users on said non-first uplink carrier using time-division multiplexing.

2. The method of claim 1 wherein the step of determining individual data transmission requirements for the plurality of mobile terminals comprises determining data rate requirements for said mobile terminals, and wherein said mobile terminals are assigned to transmit user data on either said first uplink carrier or said non-first uplink carrier based on said data rate requirements.

3. The method of claim 2 wherein mobile terminals requiring a high data transmission rate are assigned to the non-first uplink carrier, and mobile terminals requiring a low data transmission rate are assigned to the first uplink carrier.

4. The method of claim 1 wherein the step of determining individual data transmission requirements for the plurality of mobile terminals comprises determining delay sensitivity for said mobile terminals, and wherein said mobile terminals are assigned to transmit user data on either said first uplink carrier or said non-first uplink carrier based on said delay sensitivity.

5. The method of claim 4 wherein mobile terminals with a high delay sensitivity are assigned to the first uplink carrier, and mobile terminals with a low delay sensitivity are assigned to the non-first uplink carrier.

6. A base station in a multicarrier communication system, said base station comprising:
   a transceiver to receive user data transmitted by a plurality of mobile terminals on two or more uplink carriers; and
   a scheduler to schedule transmissions from said plurality of mobile terminals on said uplink carriers, said scheduler configured to:
   control an interference level on a first uplink carrier to meet a first interference target;
   control an interference level on a non-first uplink carrier to meet a second interference target higher than the first interference target;
   determine individual data transmission requirements for the plurality of mobile terminals;
   assign the mobile terminals to transmit user data on either the first uplink carrier or the non-first uplink carrier based on said data transmission requirements;
   schedule users on said first uplink carrier using code-division multiplexing; and
   schedule users on said non-first uplink carrier using time-division multiplexing.

7. The base station of claim 6 wherein the scheduler is configured to determine data rate requirements for said mobile terminals, and assign said mobile terminals to either said first uplink carrier or said non-first uplink carrier based on said data rate requirements.

8. The base station of claim 7 wherein the scheduler is configured to assign mobile terminals requiring a high data transmission rate to the non-first uplink carrier, and to assign mobile terminals requiring a low data transmission rate to the first uplink carrier.

9. The base station of claim 6 wherein the scheduler is configured to determine a delay sensitivity for said mobile terminals, and to assign said mobile terminals to either said first uplink carrier or said non-first uplink carrier based on said delay sensitivity.

10. The base station of claim 9 wherein the scheduler is configured to assign mobile terminals with a high delay sensitivity to the first uplink carrier, and to assign mobile terminals with a low delay sensitivity to the non-first uplink carrier.

* * * * *

UNITED STATES PATENT AND TRADEMARK OFFICE
CERTIFICATE OF CORRECTION

PATENT NO. : 8,498,273 B2
APPLICATION NO. : 12/537148
DATED : July 30, 2013
INVENTOR(S) : Wang et al.

Page 1 of 1

It is certified that error appears in the above-identified patent and that said Letters Patent is hereby corrected as shown below:

On the Title Page, item (57), under "ABSTRACT", in Column 2, Line 1,
delete "an apparatus" and insert -- and apparatus --, therefor.

In the Specification

In Column 1, Line 52, delete "an apparatus" and insert -- and apparatus --, therefor.

Signed and Sealed this
Twenty-sixth Day of November, 2013

Margaret A. Focarino
*Commissioner for Patents of the United States Patent and Trademark Office*